United States Patent
Mukuno et al.

(10) Patent No.: US 9,647,380 B2
(45) Date of Patent: May 9, 2017

(54) CONNECTOR

(71) Applicants: AutoNetworks Technologies, Ltd., Yokkaichi-shi, Mie (JP); Sumitomo Wiring Systems, Ltd., Yokkaichi-shi, Mie (JP); SUMITOMO ELECTRIC INDUSTRIES, LTD., Osaka-shi, Osaka (JP)

(72) Inventors: Junichi Mukuno, Yokkaichi (JP); Shiro Nishida, Yokkaichi (JP)

(73) Assignees: AUTONETWORKS TECHNOLOGIES, LTD. (JP); SUMITOMO WIRING SYSTEMS, LTD. (JP); SUMITOMO ELECTRIC INDUSTRIES, LTD. (JP)

( * ) Notice: Subject to any disclaimer, the term of this patent is extended or adjusted under 35 U.S.C. 154(b) by 0 days.

(21) Appl. No.: 15/101,941

(22) PCT Filed: Dec. 12, 2014

(86) PCT No.: PCT/JP2014/082946
§ 371 (c)(1),
(2) Date: Jun. 6, 2016

(87) PCT Pub. No.: WO2015/098571
PCT Pub. Date: Jul. 2, 2015

(65) Prior Publication Data
US 2016/0308299 A1 Oct. 20, 2016

(30) Foreign Application Priority Data
Dec. 26, 2013 (JP) .................................. 2013-268945

(51) Int. Cl.
H02B 1/01 (2006.01)
H01R 13/52 (2006.01)

(52) U.S. Cl.
CPC ..... *H01R 13/5202* (2013.01); *H01R 2201/26* (2013.01)

(58) Field of Classification Search
CPC .................. H01R 13/5202; H01R 2201/26
(Continued)

(56) References Cited

U.S. PATENT DOCUMENTS 4,592,611 A * 6/1986 Nitschke ................ H01R 13/74
439/345
6,702,611 B1 * 3/2004 Miyazaki ........... H01R 13/6593
439/559

(Continued)

FOREIGN PATENT DOCUMENTS

JP 2004-327169 11/2004
JP 2004327169 A 11/2004
(Continued)

OTHER PUBLICATIONS

Japanese Office Action Dated Oct. 11, 2016.
(Continued)

*Primary Examiner* — Abdullah Riyami
*Assistant Examiner* — Nelson R Burgos-Guntin
(74) *Attorney, Agent, or Firm* — Gerald E. Hespos; Michael J. Porco; Matthew T. Hespos

(57) ABSTRACT

A connector 1 connecting an inverter and a motor includes an inverter case 10 where the inverter is arranged, an inverter side terminal block 30 mounted on the inverter case 10, an inverter side terminal disposed on the inverter side terminal block 30, a motor case where the motor is arranged, a motor side terminal block 40 mounted on the motor case 20, a motor side terminal disposed on the motor side terminal block 40 and fit to the inverter side terminal 32 such that the inverter case 10 is opposite the motor side terminal block 40, and a second sealing member S2 arranged between
(Continued)

the inverter case 10 and the motor side terminal block 40 to surround a connection portion of the inverter side terminal 32 and the motor side terminal 42 and configured to seal a space between the inverter case 10 and the motor side terminal block 40.

3 Claims, 4 Drawing Sheets

(58) Field of Classification Search
 USPC .............. 439/278, 271, 561, 559, 248, 247; 310/71
 See application file for complete search history.

(56) References Cited

U.S. PATENT DOCUMENTS

| | | | |
|---|---|---|---|
| 6,953,357 B2 | 10/2005 | Fukushima | |
| 7,094,098 B2* | 8/2006 | Miyazaki | H01R 4/46 439/550 |
| 7,097,498 B2* | 8/2006 | Miyazaki | H01R 13/512 439/362 |
| 7,264,506 B2* | 9/2007 | Mori | H01R 11/03 439/559 |
| 8,585,421 B2 | 11/2013 | Yamaguchi et al. | |
| 8,808,026 B2* | 8/2014 | Yamaguchi | H01R 13/5202 439/559 |
| 8,951,065 B2* | 2/2015 | Tsuge | H01R 13/631 439/559 |
| 9,004,928 B2 | 4/2015 | Tanaka | |
| 9,318,826 B2* | 4/2016 | Kato | B60L 11/14 |
| 9,509,075 B2* | 11/2016 | Tomine | H01R 31/08 |
| 2004/0106323 A1* | 6/2004 | Matsushita | H01R 13/5202 439/559 |
| 2004/0214464 A1 | 10/2004 | Fukushima et al. | |
| 2004/0253868 A1* | 12/2004 | Goto | A61D 9/00 439/559 |
| 2006/0099841 A1* | 5/2006 | Coyle, Jr. | H01R 13/743 439/248 |
| 2008/0088190 A1* | 4/2008 | Ideshio | H02K 5/225 310/71 |
| 2010/0261365 A1* | 10/2010 | Sakakura | H01R 9/032 439/271 |
| 2012/0015546 A1 | 1/2012 | Yamaguchi et al. | |
| 2012/0279747 A1* | 11/2012 | Sella | H02G 3/083 174/59 |
| 2012/0319513 A1 | 12/2012 | Okamoto et al. | |
| 2013/0040473 A1 | 2/2013 | Tanaka et al. | |
| 2014/0051286 A1* | 2/2014 | Itsuki | H01R 13/533 439/587 |
| 2014/0054991 A1* | 2/2014 | Hyodo | F04C 2/18 310/71 |
| 2015/0079839 A1* | 3/2015 | Takemura | H01R 13/5202 439/559 |
| 2016/0164220 A1* | 6/2016 | Kataoka | H01R 13/5202 439/559 |
| 2016/0308299 A1* | 10/2016 | Mukuno | H01R 13/5202 |

FOREIGN PATENT DOCUMENTS

| | | |
|---|---|---|
| JP | 2011-34935 | 2/2011 |
| JP | 2011034935 A | 2/2011 |
| JP | 2011-187224 | 9/2011 |
| JP | 2012-94263 | 5/2012 |
| JP | 2012094263 A | 5/2012 |
| JP | 2013-171719 | 9/2013 |
| JP | 2013-191517 | 9/2013 |
| JP | 2013171719 | 9/2013 |
| JP | 2013171719 A | 9/2013 |
| JP | 2013191517 A | 9/2013 |

OTHER PUBLICATIONS

Japanese Office Action dated Jun. 21, 2016.
International Search Report.
Report of International Preliminary Examining Authority.
International Preliminary Report on Patentability.
Report of International Searching Authority.

* cited by examiner

CONNECTOR

BACKGROUND

1. Field of the Invention

The present invention relates to a connector.

2. Description of the Related Art

A connector for connecting an inverter and a motor in a hybrid vehicle or an electric vehicle has been known and the connector is connected to a terminal included in the inverter and a terminal included in the motor to connect the inverter and the motor. For example, Japanese Unexamined Patent Application Publication No. 2011-187224 discloses a terminal block as a connector that connects an inverter side terminal and a motor side terminal.

The terminal block disclosed in Japanese Unexamined Patent Application Publication No. 2011-187224 includes an elastic member as a waterproof member between components so that water does not enter connection portion between the terminals. However, the terminal block includes multiple elastic members between the components and therefore, a process of mounting the components may be complicated and a cost of the components may be increased.

The present invention has been completed in view of the circumstances described above. It is an object of the present invention to provide a connector that connects an inverter and a motor and has waterproof members that are reduced in number.

SUMMARY

According to the present invention, a connector connecting an inverter and a motor includes an inverter case where the inverter is arranged, an inverter side terminal block mounted on the inverter case, an inverter side terminal included in the inverter side terminal block, a motor case where the motor is arranged, a motor side terminal block mounted on the motor case, a motor side terminal included in the motor side terminal block and fit to the inverter side terminal such that the inverter case is opposite the motor side terminal block, and an elastic member arranged between the inverter case and the motor side terminal block to surround a connection portion of the inverter side terminal and the motor side terminal and configured to seal a space between the inverter case and the motor side terminal block.

In the connector, the elastic member arranged between the inverter case and the motor side terminal block surrounds the connection portion of the inverter side terminal and the motor side terminal and seals a space between the inverter case and the motor side terminal block. Thus, the elastic member functions as a waterproof member that prevents water from entering the connection portion. The inverter side terminal and the motor side terminal are connected to each other with the inverter case and the motor side terminal block being opposite each other. The elastic member that seals the space between the inverter case and the motor side terminal block can prevent water from entering the connection portion. As a result, the number of waterproof members is reduced compared to a configuration including waterproof members between the inverter case and the inverter side terminal block or between the inverter side terminal block and the motor side terminal block. According to the connector connecting the inverter and the motor, the number of waterproof members is reduce.

In the connector, the elastic member may have thickness greater than a distance between the inverter case and the motor side terminal block, and the elastic member may be arranged between the inverter case and the motor side terminal block with being compressed with respect to a fitting direction in which the inverter side terminal and the motor side terminal are fit to each other.

According to such a configuration, the elastic member is compressed when the inverter side terminal and the motor side terminal are fit to each other. According to such compression of the elastic member, the positional error caused by dimension tolerance between the inverter case and the motor side terminal block may be corrected.

In the connector, the inverter case may be mounted on the motor case via a bolt tightened with respect to the fitting direction.

According to such a configuration, the elastic member receives a load caused by the fastening of the bolt with respect to the fitting direction. Therefore, the elastic member is further compressed and sealing properties of the elastic member are improved.

According to the present invention, a number of waterproof members is decreased in the connector connecting the inverter and the motor.

DETAILED DESCRIPTION

One embodiment will be described with reference to the drawings. In this embodiment, a connector 1 that electrically connects an inverter and a motor, which are not illustrated, in a hybrid vehicle or an electric vehicle will be described as an example. An X-axis, a Y-axis, and a Z-axis are illustrated in each of the drawings and represent respective direction described with each axis in each drawing. The Z-axis corresponds to an up-down direction and an upper side in FIGS. 2 to 4 corresponds to an upper side represented by the Z-axis.

Figure 3:
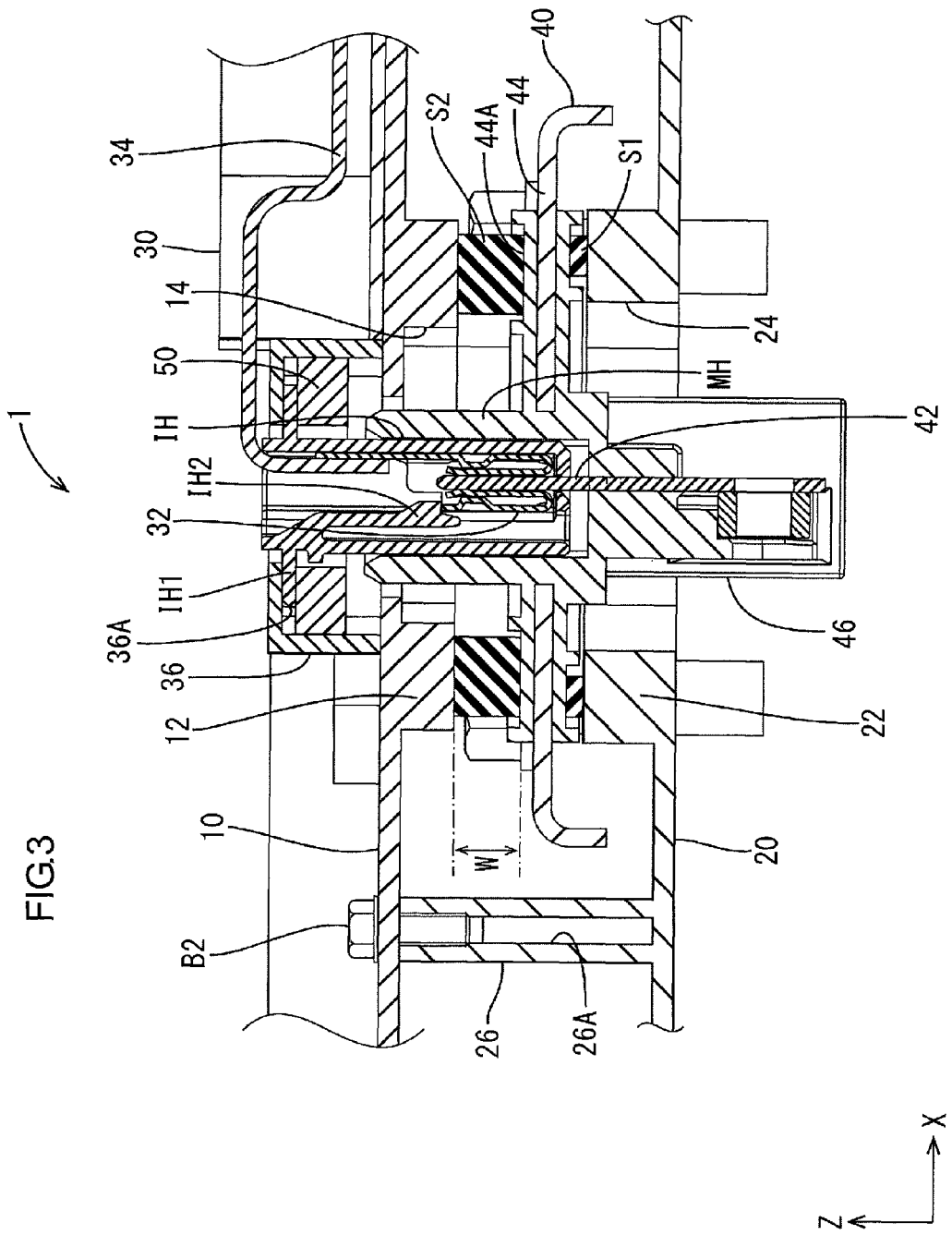
FIG. 3 is a cross-sectional view illustrating the connection portion of the inverter side terminal block and the motor side terminal block taken along line in FIG. 1.
Figure 4:
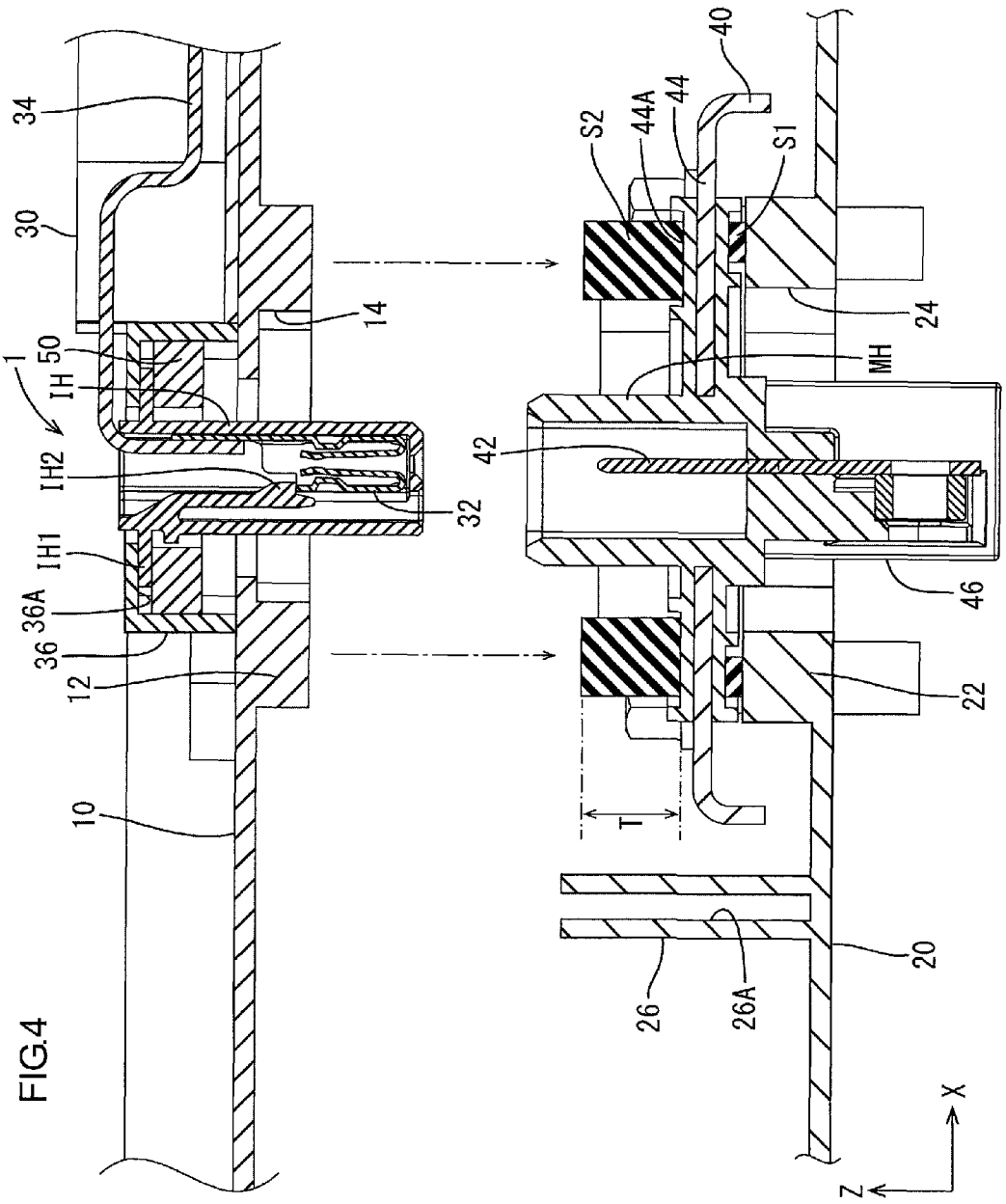
FIG. 4 is a cross-sectional view illustrating the inverter side terminal and the motor side terminal before connection thereof.

As illustrated in FIGS. 3 and 4, the connector 1 of this embodiment includes an inverter case 10, a motor case 20, an inverter side terminal block 30, an inverter side terminal 32, a braided wire 34, a motor side terminal block 40, a motor side terminal 42, an inner housing IH, a first sealing member S1, and a second sealing member (an example of an elastic member) S2. The inverter side terminal 32 is electrically connected to the inverter. The braided wire 34 is arranged in the inverter side terminal block 30. The motor side terminal 42 is electrically connected to the motor. The inner housing IH is held by the inverter side terminal block 30.

Figure 1:
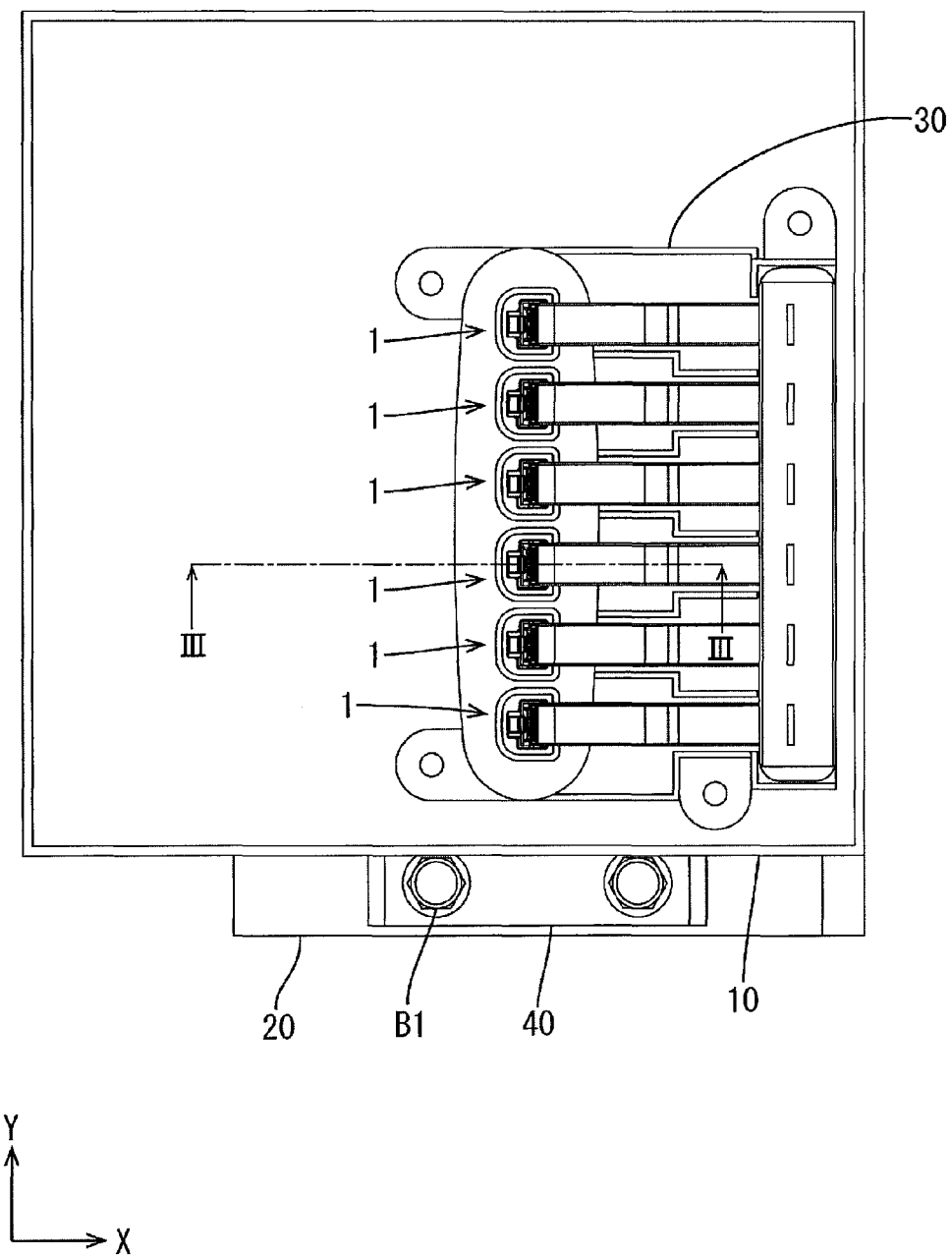
FIG. 1 is a plan view illustrating a connection portion of an inverter side terminal block and a motor side terminal block seen from above.
Figure 2:
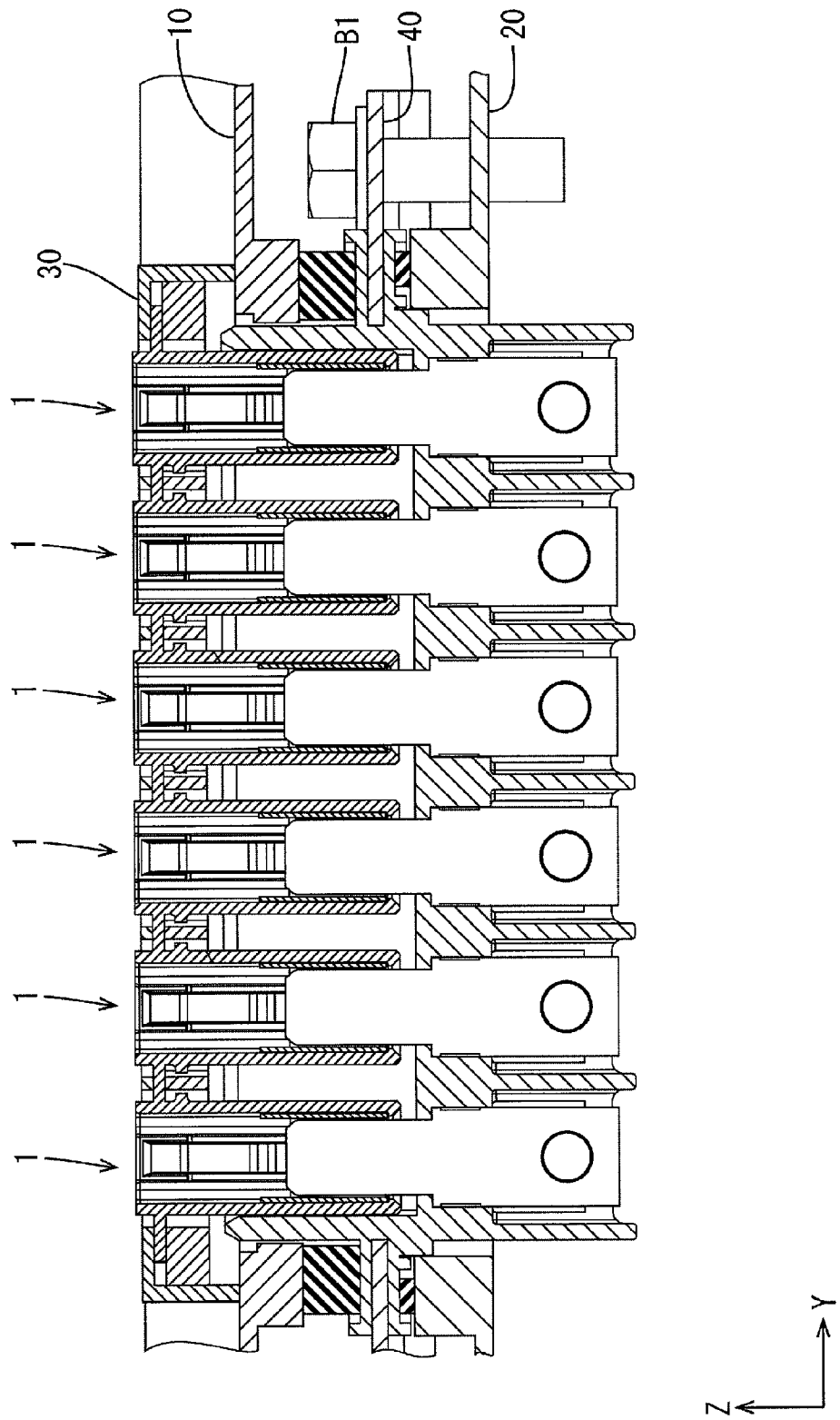
FIG. 2 is a front view illustrating the connection portion of the inverter side terminal block and the motor side terminal block seen from a front side.

As illustrated in FIGS. 1 and 2, six connectors 1 are arranged in the Y-axis direction between the inverter and the motor and are relay terminals that electrically connect the inverter and the motor. The inverter is arranged in the inverter case 10 and the motor is arranged in the motor case 20. In each drawing, an upper side is an inverter side and a lower side is a motor side, and a lower portion of the inverter case 10 covering a lower portion of the inverter and an upper portion of the motor case 20 covering an upper portion of the motor are described.

As illustrated in FIGS. 3 and 4, a part of the lower portion of the inverter case 10 includes an inverter side rib 12 and an inverter side hole 14. The inverter side rib 12 projects downwardly as a rib and defines the inverter side hole 14. A part of the upper portion of the motor case 20 includes a motor side rib 22 and a motor side hole 24. The motor side rib 22 projects upward as a rib and defines the motor side hole 24. The motor case 20 includes a fixing seat 26 projecting upward towards the inverter case 10. The fixing seat 26 is fixed to the inverter case 10 when the inverter case 10 and the motor case 20 are connected to each other. The fixing seat 26 has a insertion hole 26A where a bolt B2 is inserted.

As illustrated in FIG. 1, the inverter side terminal block 30 has a plan view size smaller than a plan view size of the lower portion of the inverter case 10 and is mounted on the inverter case 10. The inverter side terminal block 30 includes a housing mount portion 36 where the inner housing IH is mounted. The housing mount portion 36 has a short tubular shape having an opening at a lower side and an upper opening at an upper side having an upper opening edge. The upper opening edge is on an inner side from a tubular wall and a top wall having the upper opening edge extends along an X-Y plane surface. The lower surface of the top wall is a housing support surface 36A supporting the inner housing IH.

The inner housing IH has a substantially tubular shape having a shaft direction that corresponds with the up-down direction. The inner housing IH has an upper opening and extended portion IH1 extending from an outer peripheral surface of the inner housing IH near the upper opening. The extended portion extends outwardly and along the X-Y plane surface. The inner housing IH has a lower opening and the inverter side terminal 32 is arranged near the lower opening in the inner housing IH. The inverter side terminal 32 is a female terminal and is supported by a lance IH2 extending from an inner wall of the inner housing IH near the upper opening so that a connection portion of the inverter side terminal 32 faces downward.

The extended portion IH1 of the inner housing IH is in contact with the housing support surface 36A of the housing mount portion 36. A ring-shaped retainer 50 is mounted in the housing mount portion 36 from a lower opening side and the inner housing IH is inserted through the retainer 50. According to such a configuration, the extended portion IH1 of the inner housing IH is sandwiched between the housing support surface 36A and the retainer 50 and the inner housing IH is supported in a floating manner with respect to the housing support surface 36A. Thus, the inverter side terminal 32 is held by the inverter side terminal block 30 via the inner housing IH.

The inverter side terminal 32 extends away from a connection end thereof along an inner wall of the inner housing IH and has an opposite part, which is opposite from the connection end, near the upper opening of the inner housing IH. The opposite part is connected to one end portion of the braided wire 34. The braided wire 34 is a flexible conductive member and is extended within the inverter side terminal block 30 as an inner wire. The braided wire 34 has two end portions one of which is connected to the inverter side terminal 32. The other one of the two end portions of the braided wire 34 is electrically connected to the inverter.

Therefore, the inverter side terminal 32 is supplied with AC power source converted by the inverter.

As illustrated in FIGS. 3 and 4, the inverter side terminal block 30 is fixed to the inverter case 10 such that a lower surface thereof is in contact with a lower inner surface of the inverter case 10 and a lower portion of the inner housing IH is inserted through the inverter side hole 14 of the inverter case 10.

As illustrated in FIGS. 1 and 2, the motor side terminal block 40 is mounted on the motor case 20 so as to be placed on an upper portion of the motor case 20. As illustrated in FIGS. 3 to 5, the motor side terminal block 40 includes a main body 44 having a substantially plate shape and a projected portion 46 projecting downward from a part of the main body 44. The main body 44 includes a placing portion 44A on an upper surface thereof and a second sealing member S2, which will be described later, is placed on the placing portion 44A.

The projected portion 46 of the motor side terminal block 40 has an upper portion that is open upward and is a motor side housing MH where the motor side terminal 42 is arranged. The motor side terminal 42 is a male terminal and fixed to the motor side housing MH so as to extend in a up-down direction within the motor side housing MH and have a connection end on an upper side thereof. The motor side terminal 42 extends to the lower portion of the projected portion 46 and is electrically connected to the motor. The motor side terminal 42 supplies the AC power source from the inverter side to the motor side.

As illustrated in FIGS. 3 and 4, the main body 44 is arranged on the motor side rib 22 of the motor case 20 via a first sealing member S1 and the lower portion of the projected portion 44 is inserted through the motor side hole 24 of the motor case 20. With such a configuration, the motor side terminal block 40 is fixed to the motor case 20 with bolts B1 (see FIGS. 1 and 2).

The first sealing member S1 arranged on the motor side rib 22 has elasticity. The first sealing member S1 is arranged between the main body 44 of the motor side terminal block 40 and the motor side rib 22 of the motor case 20 and seals a space therebetween. According to such a configuration, the first sealing member S1 blocks water from entering the motor case 20. The first sealing member S1 is made of acrylic resin having oil resistance and seals the space between the main body 44 and the motor side rib 22 so that oil is less likely to leak from the motor case 20 to outside.

According to the connector 1 having the above configuration, as illustrated in FIG. 3, the inner housing IH is inserted in the motor side housing MH from a lower portion of the inner housing IH and the inverter side terminal 32 and the motor side terminal 42 are connected to each other via concave-convex fitting in the up-down direction (the Z-axis direction). Accordingly, the terminals 32, 42 are connected to each other with the inverter case 10 and the motor side terminal block 40 being opposite to each other. The inverter side terminal 32 and the motor side terminal 42 are connected to each other so that the terminals 32, 42 are electrically connected. Accordingly, the inverter and the motor are directly connected to each other and the AC power source converted by the inverter is supplied to the motor.

As illustrated in FIG. 3, when the inverter side terminal 32 and the motor side terminal 42 are connected to each other, the ring-shaped second sealing member S2 is arranged between the inverter case 10 and the motor side terminal block 40 so as to surround the connection portion of the inverter side terminal 32 and the motor side terminal 42. The second sealing member S2 is between the inverter case 10 and the motor side terminal block 40 and arranged on the placing portion 44A of the motor side terminal block 40 to be opposite the inverter side rib 12 of the inverter case 10.

The second sealing member S2 having elasticity is arranged between the inverter side rib 12 of the inverter case 10 and the placing portion 44A of the motor side terminal block 40 and seals a space therebetween. The second sealing member S2 is made of silicon resin having water resistance and seals the space between the inverter case 10 and the motor side terminal block 40 and functions as a waterproof member so that water is less likely to enter the connection portion of the inverter side terminal 32 and the motor side terminal 42.

The inverter case 10 includes the inverter side hole 14 on an inner side with respect to the inverter side rib 12 and the space between the inverter side rib 12 of the inverter case 10 and the placing portion 44A of the motor side terminal block 40 is sealed with the second sealing member S2. Accordingly, water is less likely to enter the inverter case 10 through the inverter side hole 14.

Next, compression of the second sealing member S2 and mounting of the inverter case 10 on the motor case 20 will be described. The second sealing member S2 is compressed when the inverter side terminal 32 and the motor side terminal 42 are connected to each other. Before connecting the inverter side terminal 32 and the motor side terminal 42, the second sealing member S2 is placed on the placing portion 44A of the motor side terminal block 40. As illustrated in FIG. 4, the second sealing member S2 placed on the placing portion 4A has thickness T (in the up-down direction) greater than a distance W between the inverter case 10 and the motor side terminal block 40 when the inverter side terminal 32 and the motor side terminal 42 are connected to each other (refer to FIG. 3).

After the second sealing member S2 is placed on the placing portion 44A, the inverter side terminal 32 and the motor side terminal 42 are fit to each other. The thickness T of the second sealing member S2 is greater than the distance W between the inverter case 10 and the motor side terminal block 40. Therefore, the inverter side rib 12 comes in contact with the upper surface of the second sealing member S2 when the terminals 32, 42 are fit to each other. As the terminals 32, 42 approach each other, the second sealing member S2 is compressed between the inverter side rib 12 of the inverter case 10 and the placing portion 44A of the motor side terminal block 40 in the up-down direction. Namely, the second sealing member S2 is compressed in a direction in which the inverter side terminal 32 and the motor side terminal 42 are fit to each other.

When the inverter side terminal 32 is connected to the motor side terminal 42, as illustrated in FIG. 3, a distal end of the fixing seat 26 projecting from the motor case 20 is put on the lower portion of the inverter case 10 and a bolt B2 is inserted through the insertion hole 26A from the inverter case 10 side. Accordingly, the inverter case 10 and the motor case 20 are fit to each other and the inverter case 10 and the motor case are fixed to each other with bolts. The inverter case 10 and the motor case 20 are connected to each other by tightening the bolts and the second sealing member S2 is further compressed in the up-down direction between the inverter case 10 and the motor side terminal block 40.

The second sealing member S2 has an effective width in a horizontal direction (a X-Y plane surface direction) and has a substantially square cross-sectional shape as illustrated in FIGS. 3 and 4. With such a configuration, the second sealing member S2 that is placed on the placing portion 44A of the motor side terminal block 40 is less likely to fall down.

As described before, according to the connector 1 of this embodiment, the second sealing member S2 arranged between the inverter case 10 and the motor side terminal block 40 surrounds the connection portion of the inverter side terminal 32 and the motor side terminal 42 and seals the space between the inverter case 10 and the motor side terminal block 40. Thus, the second sealing member S2 functions as a waterproof member that prevents water from entering the connection portion. The inverter side terminal 32 and the motor side terminal 42 are connected to each other with the inverter case 10 and the motor side terminal block 40 being opposite each other. The second sealing member S2 that seals the space between the inverter case 10 and the motor side terminal block 40 can prevent water from entering the connection portion. As a result, the number of waterproof members is reduced compared to a conventional configuration including waterproof members between the inverter case and the inverter side terminal block or between the inverter side terminal block and the motor side terminal block. According to the connector of this embodiment, the number of waterproof members is reduced with achieving connection between the inverter and the motor.

According to the connector 1 of the present embodiment, the thickness T of the second sealing member S2 with respect to the up-down direction is greater than the distance W between the inverter case 10 and the motor side terminal block 40. The second sealing member S2 is arranged between the inverter case 10 and the motor side terminal block 40 with being compressed in the direction that the inverter side terminal 32 and the motor side terminal 42 are fit to each other. According to such a configuration, the second sealing member S2 is compressed when the inverter side terminal 32 and the motor side terminal 42 are fit to each other. When the inverter side terminal 32 and the motor side terminal 42 are fit to each other, the compression of the second sealing member S2 may correct the positional error caused by dimension tolerance between the inverter case 10 and the motor side terminal block 40.

In this embodiment, the thickness T of the second sealing member S2 with respect to the up-down direction includes the distance W between the inverter case 10 and the motor side terminal block 40, a thickness dimension that is a compression amount to be compressed between the inverter case 10 and the motor side terminal block 40, and thickness for absorbing the positional error caused by the dimension tolerance.

In the connector 1 of this embodiment, the inverter case 10 and the motor case 20 are connected to each other via the bolt B2 that is fastened with respect to the up-down direction (a direction in which the terminals 32, 42 are fit to each other). According to such a configuration, the second sealing member S2 receives a load caused by the fastening of the bolt B2 with respect to the up-down direction. Therefore, the second sealing member S2 is further compressed and sealing properties of the second sealing member S2 are improved. As a result, waterproof properties of the second sealing member S2 are further improved.

In the connector 1 of this embodiment, the main body 44 of the motor side terminal block 40 has a plate shape and the main body 44 is likely to warp upwardly when the main body 44 is fixed to the motor case 20 by tightening the bolt B1 without having the second sealing member S2. In the connector 1 of this embodiment, the sealing member S2 is arranged on the placing portion 44A of the main body 44 and the second sealing member S2 is compressed so that the placing portion 44A receives a load downwardly. Thus, the warping is not or less likely to be caused in the main body 44.

The above embodiment may be modified as follows.

(1) In the above embodiment, the second sealing member seals a space between the inverter case and the motor side terminal block with surface contact sealing. The second sealing member may seal a space between the inverter case and the motor side terminal block with shaft sealing and function as a waterproof member.

(2) In the above embodiment, the second sealing member is made of silicon resin. The material of the second sealing member is not particularly limited.

(3) In the above embodiment, the second sealing member has a substantially square cross sectional shape. The shape of the second sealing member is not particularly limited.

(4) In the above embodiment, the second sealing member is arranged between the inverter side rib of the inverter case and the placing portion of the motor side terminal block. The arrangement of the second sealing member between the inverter case and the motor side terminal block is not particularly limited.

Each embodiment of the present invention is described in detail. The above description is an example and does not limit the technical scope of the present invention. The above modification aspects may be included in the technical scope of the present invention.

EXPLANATION OF SYMBOLS

1: connector
10: inverter case
12: inverter side rib
14: inverter side hole
20: motor case
22: motor side rib
24: motor side hole
26: fixing seat
26A: insertion hole
30: inverter side terminal block
32: inverter side terminal
34: braided wire
36: housing mount portion
36A: housing support surface
40: motor side terminal block
42: motor side terminal
44: main body
46: projected portion
44A: placing portion
50: retainer
B1, B2: bolt
IH: inner housing
MH: motor side housing
S1: first sealing member
S2: second sealing member

The invention claimed is:

1. A connector connecting an inverter and a motor, the connector including an inverter side rib projecting downward in a shape of a rib, the connector comprising:
   an inverter case where the inverter is arranged;
   an inverter side terminal block mounted on the inverter case;
   an inverter side terminal included in the inverter side terminal block;
   a motor case having a motor side hole that is open upward and the motor case that the motor is arranged therein and including a motor side rib on an outer peripheral side with respect to the motor side hole, the motor side rib projecting upwardly in a shape of a rib along the inverter side rib in an up-down direction;
   a motor side terminal block mounted on the motor side rib of the motor case, the motor side terminal block including a plate-shaped main body and a projected portion projecting from a part of the main body upward and downward, an upper portion of the projected portion being open upward and a motor side housing, and a lower portion of the projected portion being inserted in the motor side hole of the motor case;
   a motor side terminal included in the motor side terminal block with being arranged in the motor side housing and fit to the inverter side terminal such that the inverter case is opposite the motor side terminal block; and
   an elastic member arranged between the inverter side rib of the inverter case and the main body of the motor side terminal block to be compressed in a fitting direction in which the inverter side terminal and the motor side terminal are fit to each other and surround a connection portion of the inverter side terminal and the motor side terminal and configured to seal a space between the inverter case and the main body of the motor side terminal block.

2. The connector according to claim 1, wherein
the elastic member has thickness greater than a distance between the inverter case and the motor side terminal block.

3. The connector according to claim 2, wherein
the inverter case is mounted on the motor case via a bolt tightened with respect to the fitting direction.

* * * * *